United States Patent
Lin et al.

(10) Patent No.: US 8,294,981 B2
(45) Date of Patent: Oct. 23, 2012

(54) OPTICAL AMPLIFIERS USING SWITCHED FILTER DEVICES

(75) Inventors: Christopher Lin, El Cerrito, CA (US); Ming Cai, Fremont, CA (US); Martin Williams, Big Flats, NY (US)

(73) Assignee: Oclaro Technology Limited, Northamptonshire (GB)

( * ) Notice: Subject to any disclaimer, the term of this patent is extended or adjusted under 35 U.S.C. 154(b) by 524 days.

(21) Appl. No.: 12/584,919

(22) Filed: Sep. 15, 2009

(65) Prior Publication Data

US 2011/0063720 A1    Mar. 17, 2011

(51) Int. Cl.
*H04B 10/17* (2006.01)
*H04B 10/12* (2006.01)

(52) U.S. Cl. .................. 359/337.2; 359/337.1

(58) Field of Classification Search .............. 359/337.1, 359/337.2, 889, 890
See application file for complete search history.

(56) References Cited

U.S. PATENT DOCUMENTS

| | | | |
|---|---|---|---|
| 5,506,920 A * | 4/1996 | Suemura et al. ............... 385/25 |
| 5,805,759 A * | 9/1998 | Fukushima ................... 385/140 |
| 5,966,987 A * | 10/1999 | Yoon et al. ................... 74/89.23 |
| 6,072,601 A * | 6/2000 | Toyohara ...................... 358/484 |
| 6,157,025 A * | 12/2000 | Katagiri et al. ............... 250/226 |
| 6,483,631 B1 | 11/2002 | Cheng et al. |
| 6,498,676 B1 * | 12/2002 | Zimmerman et al. ..... 359/337.1 |
| 6,888,856 B2 * | 5/2005 | Green et al. .................... 372/20 |
| 6,941,040 B2 * | 9/2005 | Devenyi et al. ................ 385/31 |
| 7,016,096 B2 * | 3/2006 | Izumi et al. ................... 359/280 |
| 7,242,520 B2 * | 7/2007 | Backus et al. ................ 359/347 |
| 7,508,577 B2 * | 3/2009 | Benz et al. ................ 359/337.2 |
| 7,554,717 B2 * | 6/2009 | Nakano et al. ................ 359/333 |
| 2002/0054614 A1 * | 5/2002 | Jin .................................. 372/20 |
| 2002/0126345 A1 * | 9/2002 | Green et al. ................... 359/122 |
| 2002/0167245 A1 | 11/2002 | Hung et al. |
| 2005/0068612 A1 * | 3/2005 | Wilson et al. ................. 359/337 |
| 2007/0030559 A1 * | 2/2007 | Backus et al. ............. 359/337.1 |
| 2007/0030560 A1 * | 2/2007 | Backus et al. ............. 359/337.1 |

FOREIGN PATENT DOCUMENTS

CA       2317133 A1 *  2/2001

OTHER PUBLICATIONS

PCT/US2010/002450 International Search Report (Nov. 5, 2010).

\* cited by examiner

*Primary Examiner* — Eric Bolda
(74) *Attorney, Agent, or Firm* — Patterson & Sheridan, L.L.P.

(57) ABSTRACT

Described are Gain Flattening Filters (GFFs) implemented using mechanical translating assemblies to move selected thin film Gain Attenuating Filters (GAFs), and combinations of selected GAFs, into or out of the output path from an optical amplifier. The GAFs may be used singly, or in combinations that synthesize many target filter characteristics. The GFF is primarily adapted for WDM systems operating with a wavelength range of approximately 1520 nm to 1620 nm. Several embodiments are shown for effectively combining different GAFs to provide multiple GFF curves.

7 Claims, 9 Drawing Sheets

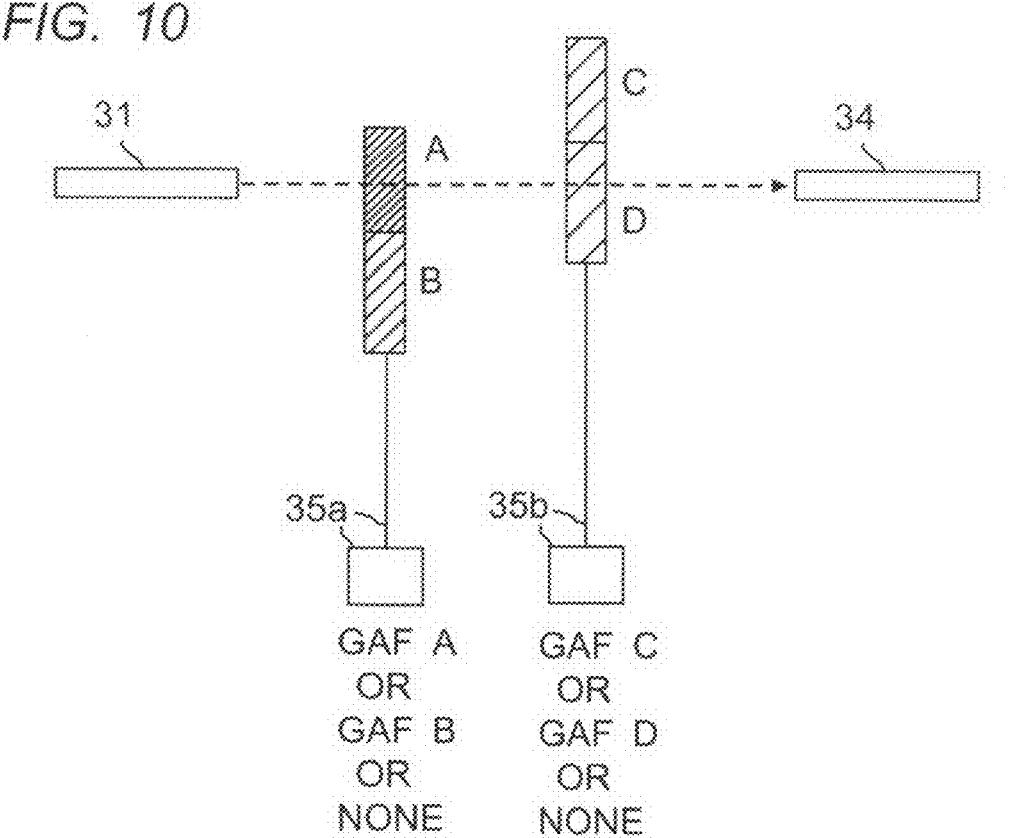
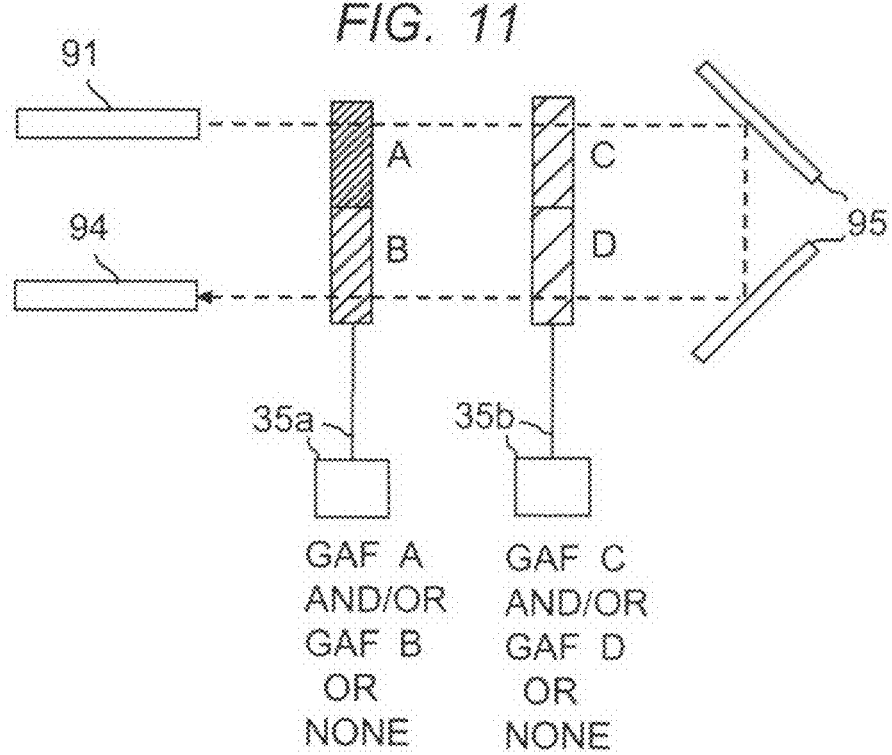

US 8,294,981 B2

OPTICAL AMPLIFIERS USING SWITCHED FILTER DEVICES

FIELD OF THE INVENTION

This invention relates to optical amplifiers in which wavelength dependent variations in the optical gain vs. wavelength relationship are reduced using gain flattening filters.

BACKGROUND OF THE INVENTION

Optical amplifiers are used widely in optical systems, particularly optical transmission systems. In wavelength division multiplexed (WDM) systems they operate over a wide wavelength range, typically 1520 nm to 1570 nm, and in some systems to 1620 nm. Most optical amplifiers are known to produce non-uniform gain outputs over this broad range. Erbium-doped fiber amplifiers (EDFAs) are widely used in optical communications systems, but, while effective in terms of performance, size, cost, and reliability, erbium-doped fiber itself produces gain curves that are not only non-linear, but have wide swings with multiple inflections. Typically the gain curve produced by erbium-doped fiber has a maxima around 1530 and at least one other around 1560.

Raman amplification, widely used in undersea cables, also produce non-uniform gain curves.

The non-uniformities are usually addressed by providing gain flattening filters (GFFs, sometimes referred to as gain equalizing filters) within or at the output of the optical amplifier. Since the gain curves are highly non-uniform, some portions of the gain curve require flattening while others may not. Accordingly GFFs are frequently tailor made to produce an attenuation curve that is the inverse of the amplifier gain curve.

Optical filters come in a variety, of forms. The most common are Thin Film Filters (TFF), Array Waveguides (AWG), Long Period Gratings (LPGs) and Fiber Bragg Gratings (FBGs). For a variety of reasons, TFFs are the most versatile. Combinations of TFFs are available for all common gain flattening filter applications. Moreover, TFFs provide:

Thermal stability
Superior optical properties including
  Low insertion loss
  Wide and flat passband
  Excellent isolation
  Small polarization dependent loss
Modularity and scalability
Low cost through cost effective manufacturing using batch processes The drawback to TFFs for gain flattening is that the filter is typically custom made to filter a specific optical spectrum. Thus, while TFFs can be easily made for essentially any spectrum, they are not adjustable in the event the spectrum changes.

A competing option for flattening amplifier gain curves is Dynamic Gain Equalization (DGE). Devices using this approach have a diffraction grating in combination with an array of MEMS or LC tuning elements to create dynamically settable GFF responses. Since they are adjustable they can account for changes in the gain curve of the amplifier(s). However, DGE devices are complex, expensive and have high loss. Consequently, DGEs are typically used after multiple amplifiers stages to equalize the composite gain.

A simpler, cost effective solution, based on TFFs, but with dynamic control would be a significant contribution to the technology. Moreover, if the cost is low, integrating a GFF device with each single amplifier stage would be cost effective.

STATEMENT OF THE INVENTION

The GFF of the invention is implemented using mechanical translating assemblies to move selected gain attenuating filters (GAFs), and combinations of selected GAFs, into or out of the output path from the optical amplifier. The GAFs may be used singly or in combinations that synthesize many target filter characteristics.

BRIEF DESCRIPTION OF THE DRAWING

FIG. 10 is a schematic view of another embodiment of the invention showing TTFs with multiple GAFs on a common translating mechanism;

FIGS. 11 through 13 are schematic views of an embodiment of the invention wherein the optical path is folded for added functionality and compactness;

FIG. 15 also illustrates an option where the optical path is moved with respect to the GFF;

DETAILED DESCRIPTION

In this description, a TFF type GAF is intended to mean a thin film GAF that operates to attenuate the light in the amplifier gain spectrum but not block it. The amplifier gain spectrum is meant to refer to the wavelength range over which the amplifier is intended to operate. As indicated earlier, in a conventional WDM system, that wavelength range may be 1520 nm to 1570 nm. Thus, TFF type gain attenuating filters are different in this regard from gain rejection filters or gain blocking filters, both of which normally function to essentially eliminate wavelengths in the target optical gain. Since the TFF type gain attenuating filters may address different attenuation values under different conditions, flattening the amplifier gain spectrum may require two or more separate TFF type gain attenuating filters.

The spectrum used in the following description to illustrate the principles of the invention is the commonly used WDM spectrum. However, the invention may be applied to any optical spectrum that is sufficiently broad to need equalization. In general, that would be a wavelength range of at least 30 nm.

Figure 1:
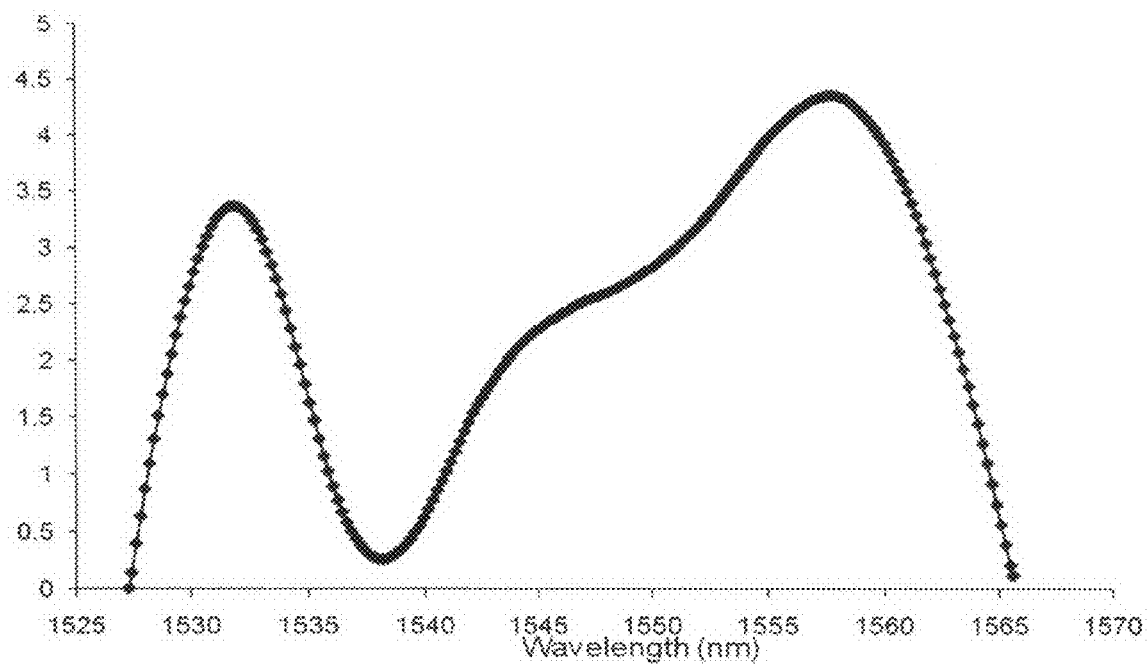
FIG. 1 is a representative gain flattening filter curve with gain in dB plotted vs. wavelength.

With reference to FIG. 1, an example of a typical optical fiber amplifier gain flattening filter is shown at 11. This is representative of a gain flattening curve used to flatten the output from an EDFA. Similar curves are produced by other amplifiers, and may vary significantly in shape. The wavelength range shown extends from 1520 nm to 1570 nm, a range typical for state of the art WDM systems. The ordinate scale represents the gain flattening filter characteristic in dB. The design objective for the GFF is to provide an inverse gain profile of the amplifier gain curve.

Figure 2:
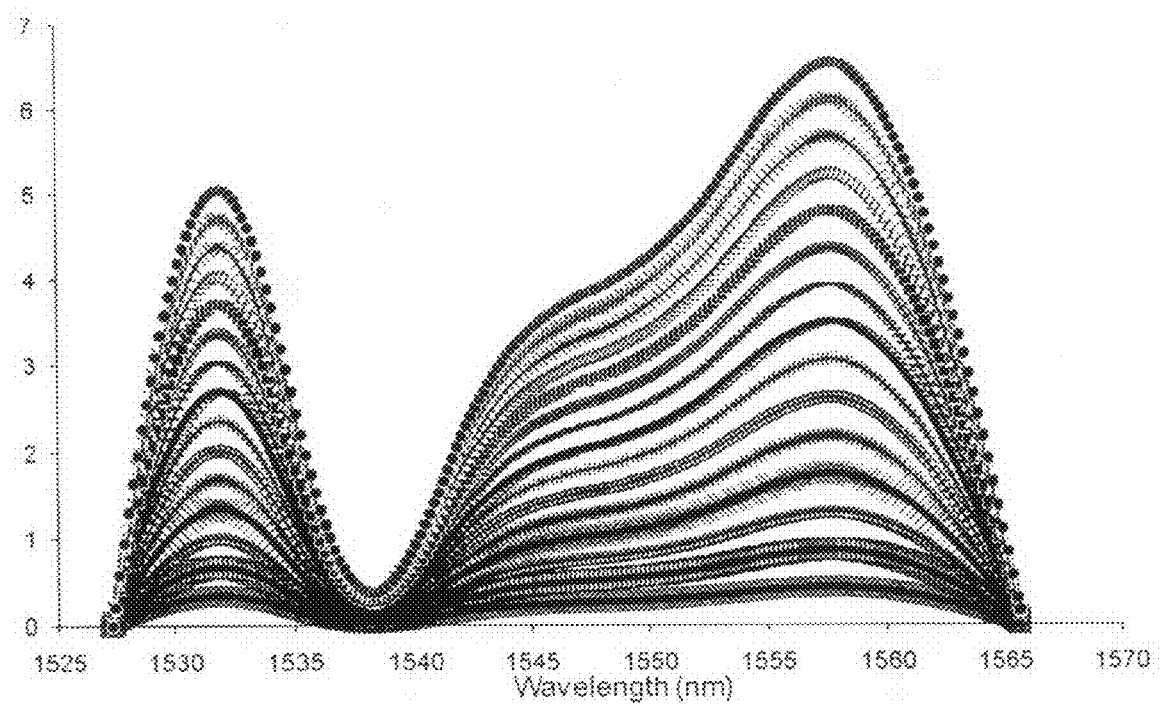
FIG. 2 shows a series of fifteen gain filter targets that are typically formed as single filter elements.

For typical EDFA devices the gain curves may vary widely. To provide a capability of flattening these wide variations may require a large number of gain flattening filters, representing a large number of targets. FIG. 2 illustrates fifteen potential gain flattening filter targets. The number fifteen is chosen as an example to illustrate the invention.

These fifteen filter characteristics may be synthesized using fewer TFF filters, in various combinations, according to one aspect of the invention.

Figure 3:
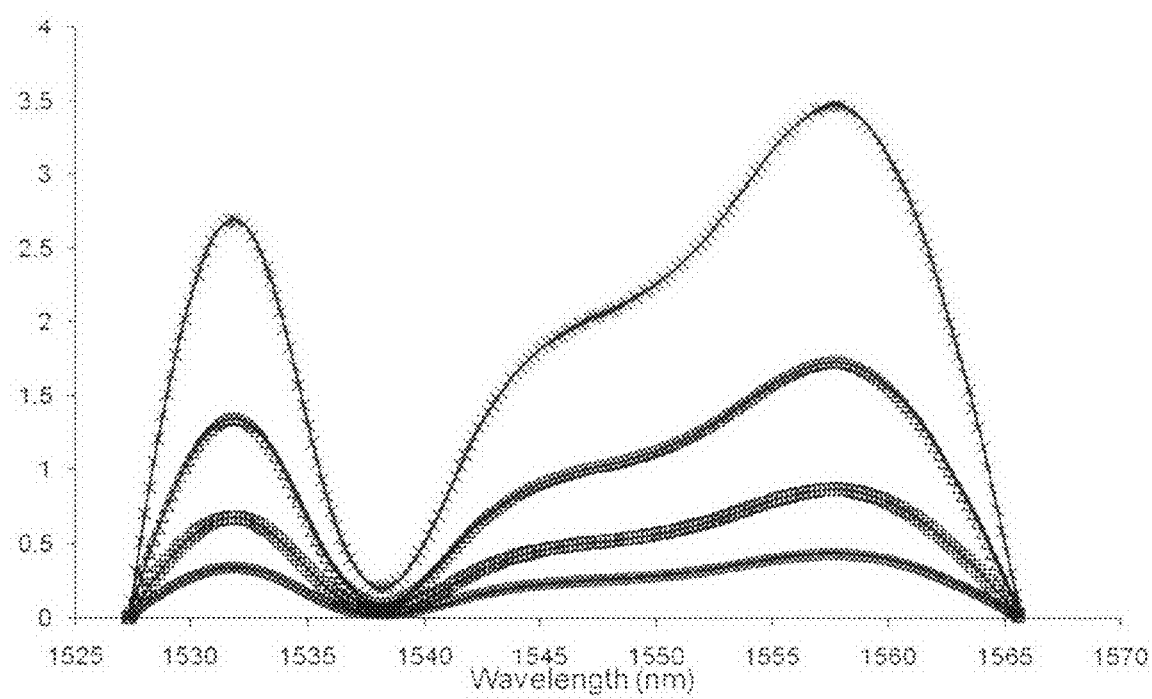
FIG. 3 is a plot of gain vs. wavelength representing four gain filter synthesizing blocks that may be used in combinations according to alternative embodiments of the invention to synthesize the gain filter targets of FIG. 2.

Schematically represented in FIG. 3 are four GAF curves, A, B, C, D. Each curve represents a separate gain filter synthesizing block. Using combinations of the synthesizing blocks, any of the target filter characteristics of FIG. 2 may be synthesized. GAF A is has the approximate filter characteristic of the lowest curve in FIG. 3, and for purposes of illustration, is assigned an attenuation value "X". GAF B provides an approximate attenuation curve 2X. GAF C has an approximate attenuation curve 4X, and GAF D has an approximate attenuation curve 8X. Each of the fifteen curves of FIG. 3 may be synthesized as shown in the following table:

```
1 = A
2 = B
3 = A + B
4 = C
5 = A + C
6 = B + C
7 = A + B + C
8 = D
9 = D + A
10 = D + B
11 = A + B + D
12 = C + D
13 = A + C + D
14 = B + C + D
15 = A + B + C + D
```

It should be understood that the number of GAFs and the gain curves they represent are for illustration of the principles of the invention. Other embodiments may use fewer GAFs or more GAFs, each with an effective attenuation greater or smaller than those just shown. These would be combined in a suitable fashion and fixed into the path of the amplifier output beam.

The filter combinations in the table above are based on multiples of attenuation value X, namely X, 2X, 4X and 8X. Similar results may be obtained with other combinations. For example, using the methods and apparatus of the invention, 32 different gain curves may be synthesized using only seven filters, the seven filters having attenuation values of 20X, 10X, 5X, X, X, X, and X.

Figure 4:
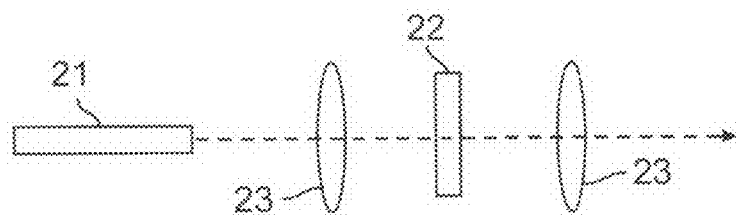
FIG. 4 is a schematic representation of an optical beam traversing a GAF mounted between collimating lenses.

FIG. 4 shows an optical fiber output from an amplifier 21, collimating lenses 23, and GAF 22. The beam incident on the GAF is shown normal to the plane of the GAF, and transmits through the filter. Reflection mode optical filters are also available but transmission filters are preferred for this invention. Also, the beam is not required to be incident normal to the filter plane. However, again that feature is preferred. Normal or near normal incidence reduces unwanted reflections and also, in some cases, unwanted refractions. Alternatively, there are GFF designs that take advantage of off-normal incidence. See for example, U.S. Pat. No. 7,295,365, issued Nov. 13, 2007. Accordingly, embodiments of the invention to be described below, in particular those of FIGS. 11-15, may employ off-normal incidence.

Figure 5:
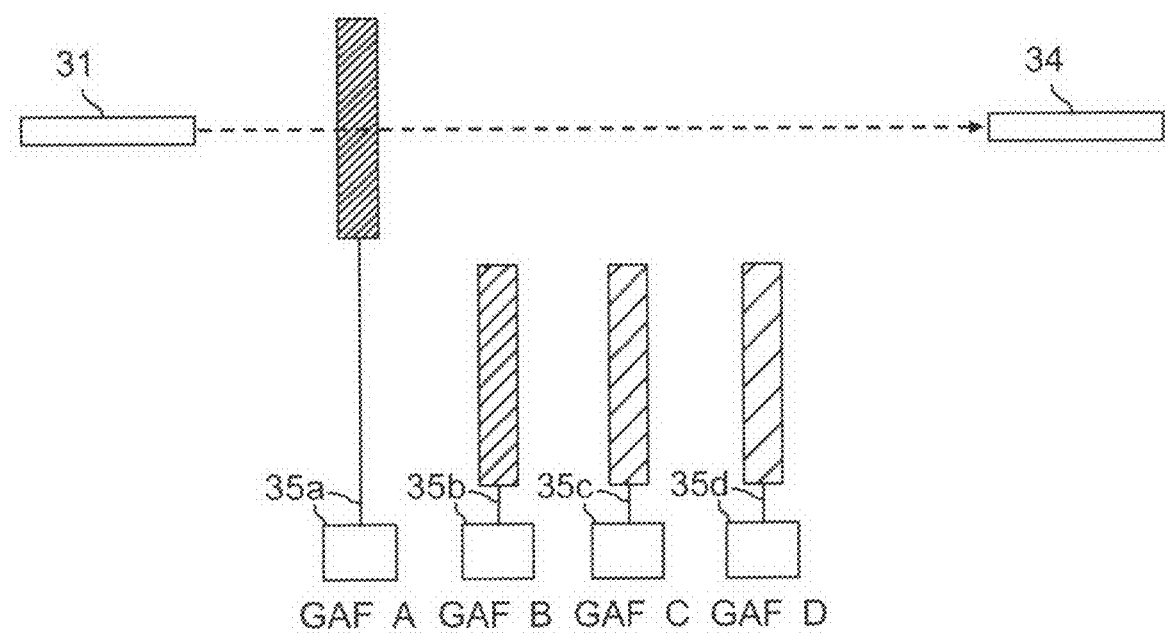
FIGS. 5 through 9 are schematic views of embodiments of the invention showing movable GAFs that selectively intersect an amplifier output beam.

An embodiment of the invention is shown in FIG. 5, where the output fiber from the optical amplifier is shown at 31, and a corresponding output fiber from the GFF is shown at 34. The output fiber 31 may be attached to the amplifier or be an integral portion of the amplifier, as, for example, the optical fiber in an EDFA. In that case, element 31 represents an optical amplifier. Four GAFs, are shown. In one embodiment, the four GAFs correspond to four GAFs described in connection with FIG. 2. In the context of this embodiment the GAFs is simply any desired selection, and number, from the multiple filter characteristics shown in FIG. 2. In another embodiment of the invention, the four GAFs correspond to the four filter characteristics shown in FIG. 3.

Each GAF is mounted on a mechanical translating assembly 35a, 35b, 35c, and 35d, respectively. The translating assemblies are suitable combinations of actuating arms attached to the GAFs, and servomotors for moving the actuating arms. The mechanical translating assemblies are designed to insert a selected GAF into the optical path between the GFF input fiber 31 and the output fiber 34. A variety of mechanical arrangements will occur to those skilled in the art. It is only necessary that the translating assemblies serve to move each actuating arm, and its associated GAF, independent of the others, from a position removed from the optical beam to a position in the path of the optical beam, and vice versa, or between other positions as described below.

FIG. 5 shows a single GAF, GAF A, selectively inserted into the path of the optical beam. In one embodiment the single GAF, and any of the other single GAFs B, C, and D, may have any desired filter characteristic, e.g., any of the characteristics shown in FIG. 2. However, for convenience, the description below addresses also the embodiment wherein combinations of GAFs are used to synthesize a given desired filter characteristic. Using the apparatus of FIG. 5 any of the combinations of GAFs shown in the table above may be combined to synthesize any of the target curves of FIG. 2.

Figure 6:
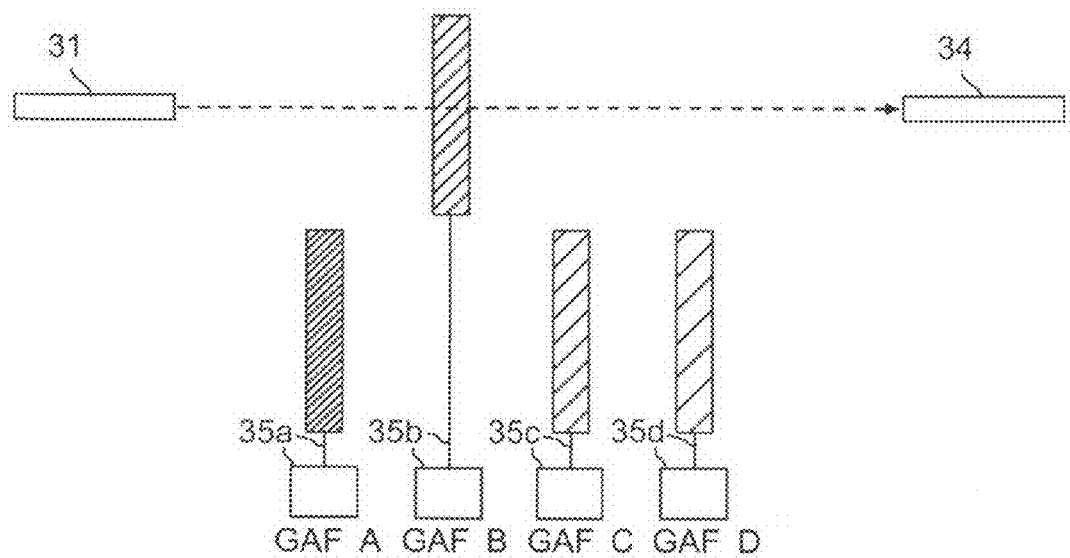
Figure 7:
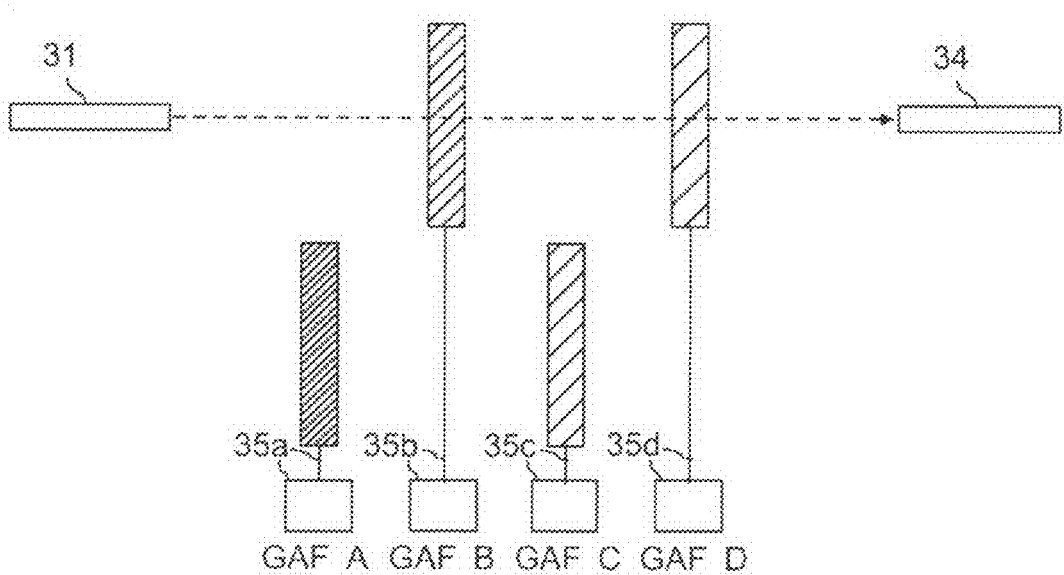
Figure 8:
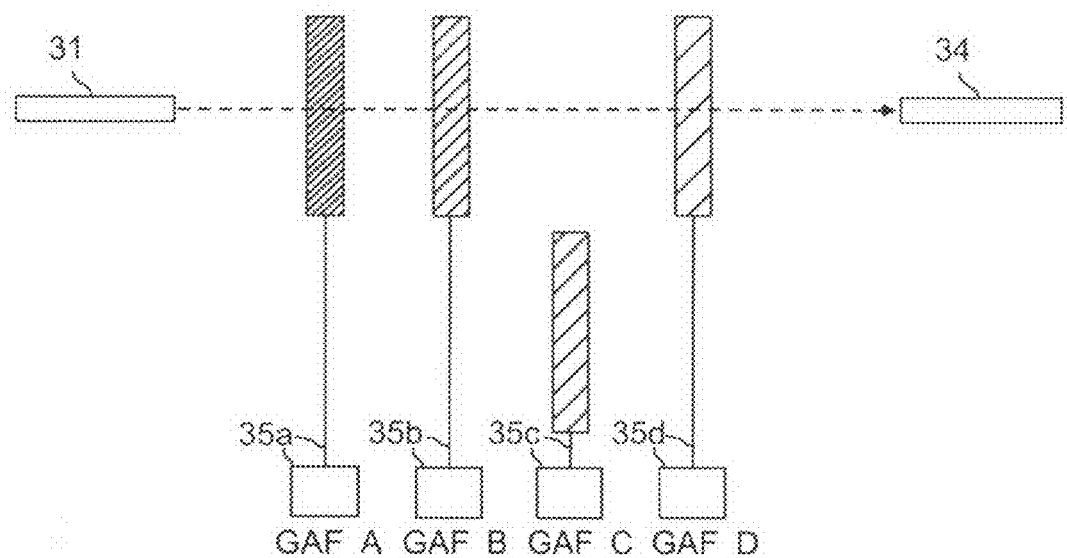
Figure 9:
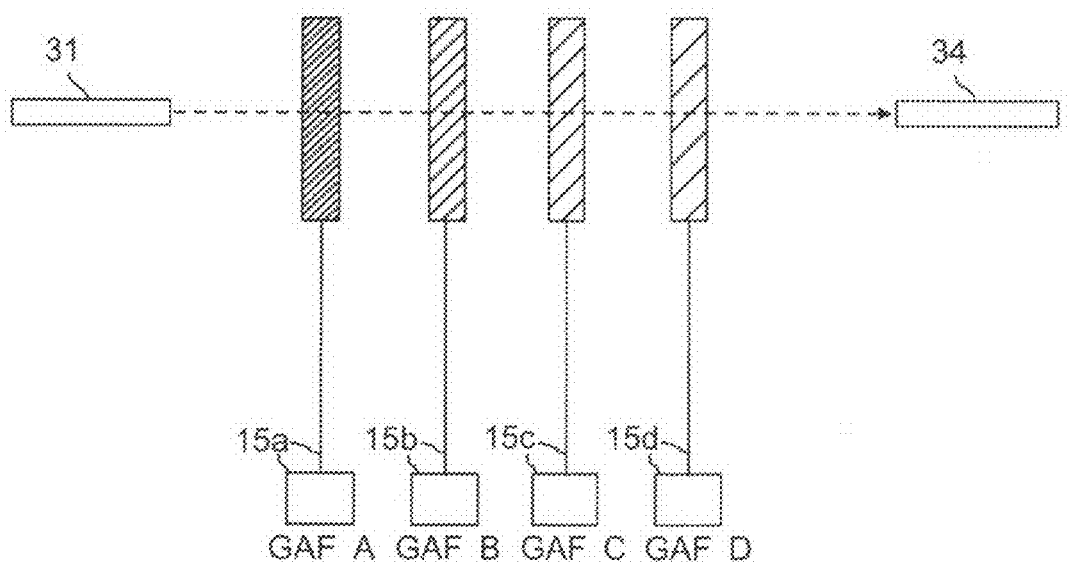

FIG. 6 shows a GFF with GAF B activated for gain flattening. FIG. 7 shows two GAFs, GAF B and GAF D, selectively inserted into the path of the optical beam. FIG. 8 shows a GFF with three GAFs, GAF A, GAF B, and GAF D activated for gain flattening. And FIG. 9 shows an arrangement with all four GAFs inserted into the path of the optical beam.

The embodiments represented by FIGS. 5-9 allow for synthesizing the fifteen different combinations of the four GAFs, A, B, C, D described earlier. Adding another GAF, GAF E, allows another sixteen target filter curves to be synthesized, thereby providing thirty-one target filter curves using only five filter elements. It may be appreciated that this approach allows a GFF designer to flatten a wide variety of amplifier gain curves.

Mechanical translating assemblies of the kind described above and below are typically provided with controllers that use software to coordinate the mechanical motions described. For the embodiments shown in FIGS. 5 and 6, the controller activates one mechanical translating assembly at a time. For the embodiments represented by FIGS. 7-9 the controller simultaneously activates a plurality of mechanical translating assemblies.

FIG. 10 shows a modification of the invention designed to reduce the size and complexity of the GFFs shown in FIGS. 5-9. In this embodiment, the actuating arm comprises at least two GAF filter elements. For example, the actuating arm associated with translating assembly 35a has a GAF A, and a GAF B. The actuating arm associated with translating assembly 35b has a GAF C and a GAF D. The mechanical translating assembly 35a has GAF A positioned in the path of the optical beam from amplifier output fiber 41, while mechanical translating assembly 35b has GAF D positioned in the path of the optical beam. Thus the GFF will flatten the optical beam according to the characteristics of the combination of GAFs A and D. It will be evident that other combinations can be used, and that additional GAFs can be added to the GFF. It is also evident that the GAF elements may have more than two different GAFs.

A more compact GFF device may be realized using folded optical beams. FIG. 11 shows the optical path from amplifier out fiber 91 folded by mirror pair 95, returning the optical beam to GFF output fiber 94 in the opposite direction. In this illustration the optical path $p_1$ between fiber 91 and the mirror pair is intersected by GAF A plus GAF C, while the return path $p_2$ from mirror pair 95 to the GFF output fiber 94 is intersected by GAF D and GAF B. Thus the GFF in this example has all four GAFs, A, B, C, and D in the optical path. The mechanical translating assembly 35a may be activated alternatively to insert either GAF A or GAF B into optical path $p_1$. It may also move the filter element so that neither GAF A nor GAF B intersects path $p_1$. Likewise, the mechanical translating assembly 35b may be activated to insert either GAF C or GAF D into optical path $p_2$. It may also move the filter element so that neither GAF C nor GAF D intersects path $p_2$.

Figure 12:
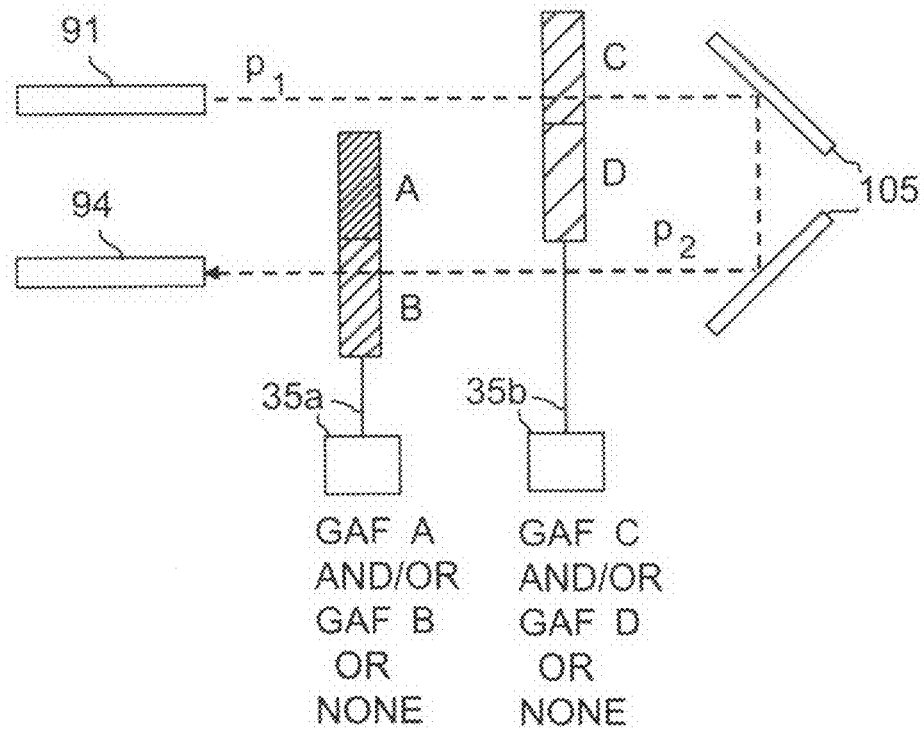

FIG. 12 illustrates the case where mechanical translating assembly 35a has moved the GAF element so neither GAF A nor GAF B intersects path $p_1$, while GAF B is moved to intersect path $p_2$. Translating assembly 35b is activated to move GAF C to intersect path $p_1$ while neither GAF C or GAF D intersects path $p_2$.

Figure 13:
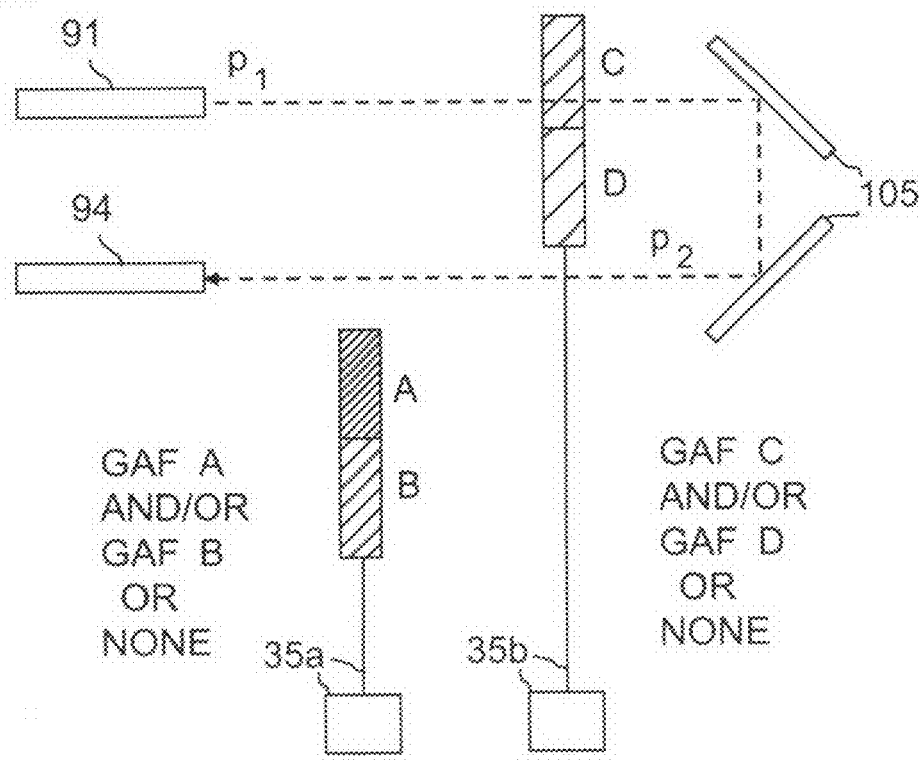

FIG. 13 illustrates the case where mechanical translating assembly 35a has moved the GAF element so neither GAF A nor GAF B intersects path $p_1$, or path $p_2$, while translating assembly 35b remains activated with GAF C in path $p_1$, with neither GAF C nor GAF D intersecting path $p_2$.

In FIGS. 11-13 the optical beam is folded using reflector elements. This provides the advantage mentioned earlier, that the apparatus may be designed conveniently so that the beam is incident on the optical elements in a normal direction. Alternatively, the beam may be folded using a single reflector element. In that case the beam will typically intersect the reflector element with off-normal incidence. The GAFs, however, may be arranged so the beam is perpendicular to the surface of the GAF.

The embodiments represented by FIGS. 11-13, with the optical beam folded using mirrors provides all of the combinations of the embodiment represented by FIGS. 5-9, but with only two GAF elements and only two mechanical translating assemblies.

Figure 14:
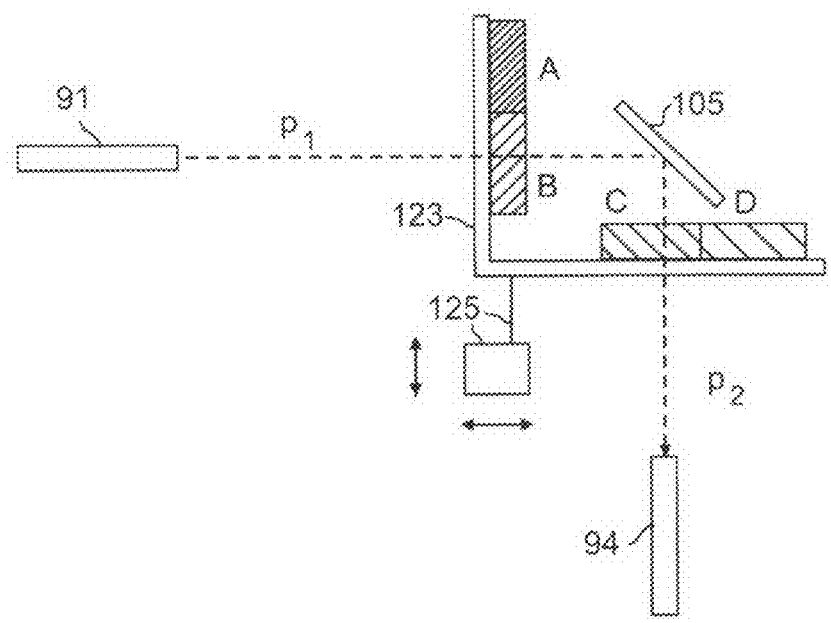
FIG. 14 is a schematic view of another embodiment of the invention wherein the optical path is folded for added functionality and compactness.

FIGS. 11-13 show the optical path folded into two portions, with the second portion extending in a direction opposite to the first. Alternatively, the optical beam may be folded in other configurations, for example, where the second portion extends perpendicular to the first. Using for example, L-shaped GAF combinations, and selectively translating the GAFs in two orthogonal directions, yields results similar to those described for the GFFs of FIGS. 11-13. An embodiment based on this principle is shown in FIG. 14. Four GAFs, as in the earlier illustrations, are mounted on L-shaped member 123. When reference is made herein to "L-shaped" that reference is meant to define two straight portions coupled at 90 degrees, and is meant to include cases where the two straight portions are of equal, as well as unequal, length. The mechanical translating assembly 125 moves the L-shaped member in two orthogonal directions as indicated. When actuated in the vertical direction, either GAF A or GAF B, or no GAF, is inserted into path $p_1$ of the output of the amplifier 91. When actuated in the horizontal direction, either GAF C, or GAF D, or no GAF, is inserted into the path $p_2$ reflected from reflector 105. In the positions shown, the optical beam is filtered by a combination of GAF B and GAF C.

FIG. 14 demonstrates that with a folded beam, using a single movable GAF element, and a single mechanical translating assembly, eight different filter combinations are available. FIGS. 11-14 demonstrate the design versatility added when using folded beams. A folded beam is defined as a beam that undergoes at least one reflection.

Figure 15:
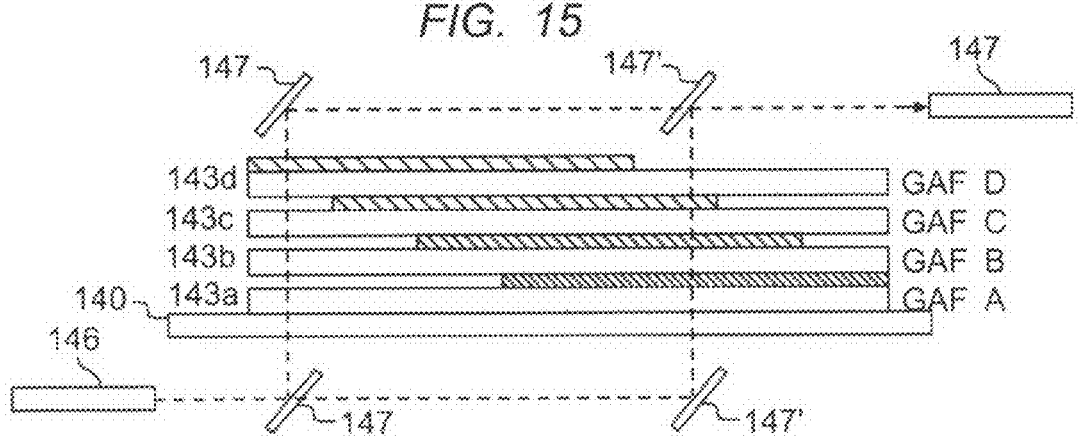
FIG. 15 is a representation of a GAF stack, a convenient structure for implementing the invention.

Another alternative GFF design is shown in FIG. 15. Here a single physical filter block comprising stacked substrates 143a, 143b, 143c and 143d is formed with substrate 143a having GAF A, substrate 143b having GAF B, substrate 143c having GAF C and substrate 143d having GAF D. The optical beam from amplifier output fiber 146 is caused to selectively traverse different regions of the stacked substrates. In the position shown to the left of the figure, the beam reflects from mirrors 147, and intersects GAF A only. In the alternative position shown to the right of the figure, the beam reflects from mirrors 147' and intersects GAF A, GAF B, and GAF C. Shifting the beam position laterally left to right or vice versa, presents seven different filter combinations.

The number of filter combinations needed to address typical gain curves may vary significantly depending on the application. While the embodiment of FIG. 15 provides fewer options that those allowed by some of the embodiments in FIGS. 3-12, fewer combinations may be found useful for some applications. If more combinations are desired for a GFF designed in accordance with the teachings of FIG. 15, another GAF stack may be provided side-by-side with the GAF stack shown. If the substrates 143a to 143d on that stack have the GAFs A, B, C, D, arranged with GAF B on substrate 143b, GAF D on substrate 143b, GAF A on substrate 143c, and GAF C on substrate 143d, an additional six new positions are available, bringing the total number to 13. Additional combinations may be provided by adding additional GAF stacks, or additional GAF regions on the stacks shown.

It will be recognized that in all of the embodiments of the invention it is necessary to move the beam and the GAFs with respect to one another. FIGS. 3-12 show embodiments where the GAFs are moved. That approach may be implemented in the embodiment of FIG. 14 by mounting the stacked filter block on a moveable table 140, controlled for example by a suitable servomotor. However, the other option, moving the beam, may in some cases be preferred. FIG. 15 is meant to represent that option, with reflectors 147 steering the beam and being moveable. The reflectors may be mounted on a movable support, actuated by a mechanical translating assembly (not shown). The mirrors may be mechanically coupled to one another to ensure desired alignment.

While in the embodiments of FIGS. 3-12, each mechanical translating assembly is designed so that a single separate GAF attached to that assembly may be inserted in the optical path at a given time, combinations of GAFs, e.g., pairs of GAFs may be fixed to a single mechanical translating assembly. Similarly, selected GAFs may be permanently fixed in the optical path to address ubiquitous features in the gain curves, while other GAFs are movable according to the invention.

The invention provides another important attribute for GFF's, continuous tuning. Referring again to FIG. 15, it will be appreciated that as the mirrors 147 or 147' are moved, the filter characteristic adjusts incrementally, and one or more filters are always in the path of the light beam. This contrasts with the case where one filter is replaced by another filter. In that case the filter characteristic returns to zero each time the filter is adjusted. In a dynamic system, the user will experience large and possibly unacceptable swings in the amplifier output. Using continuous tuning, afforded by the system of the invention, allows dynamic operation without abrupt changes in the amplifier output.

In the illustrations above, four different GAFs are used by way of example. It is understood that this number may be smaller or larger, but will be two or more and preferably three or more.

It should be understood that in all of the applications above all of the filters used are considered GAFs. In the examples described the filters are designed for the entire wavelength gain being compensated. Alternatively, filter combinations may be used wherein a given filter addresses selected regions of the overall gain curve. In that case, significant gain curve shaping may be achieved. Accordingly, the term GFF is intended as applying to cases where the shape of the gain curve is addressed as well as cases where the gain level of the whole gain is reduced (flattened).

The invention has been described mainly in the context of optical fibers, and this context is expected to be the most relevant in commercial practice. However, the principles apply to other forms of optical waveguides, for example, waveguides in planar optical integrated circuits. To be effective, the GAFs described may be inserted at any suitable point in the optical path associated with an optical amplifier. That could include the optical path prior to the amplifier optical fiber as well as after the amplifier optical fiber, or even in within the amplifier fiber itself, i.e., between lengths of amplifying optical fiber. When an optical amplifier is characterized as having an "optical path", that expression is intended to cover these options. Likewise, in the embodiments in which the optical path is folded to form a first optical path segment and a second optical path segment, the position of the segments may follow the same options.

When a GAF is referred to as intersecting an optical path or not intersecting an optical path it should be understood that the reference is to the effective filter portion of the GAF. As indicated earlier, typical GAFs comprise thin films of filtering material usually coated onto a substrate, e.g., a glass substrate. In the embodiments where a GAF is shown in a position where the GAF does not intersect an optical path, and the GAF is adapted to be translated to a position where the GAF does intersect an optical path, it may be preferred that the GAF comprise a substrate with a portion coated with a filter layer and a portion blank, i.e., uncoated. When the GAF is positioned to intersect the optical path, the coated portion of the GAF is inserted into the optical path. When the GAF is translated to a position where the GAF is intended not to intersect an optical path, the uncoated portion is inserted into the optical path. This expedient reduces edge effects caused by the substrate edges during the transition between positions.

It will be evident to those skilled in the art that a wide variety of compensation schemes may be implemented using the methods and apparatus of the invention. All those modifications and deviations from the specific teachings of this specification that basically rely on the principles and their equivalents through which the art has been advanced are properly considered within the scope of the invention as described and claimed.

The invention claimed is:

1. An optical system comprising:
   an optical amplifier, the optical amplifier having an optical path, wherein the optical path is folded resulting in a first optical path segment and a second optical path segment, and
   a gain flattening filter (GFF) with portions of the GFF adapted to be selectively inserted to intersect the first optical path segment and other portions of the GFF adapted to be selectively inserted to intersect the second optical path segment, wherein the GFF comprises:
      a first actuating arm comprising a first GAF and a second GAF, wherein the first actuating arm is movable between a first position where the first GAF intersects the first optical path segment and the second GAF intersects the second optical path segment, a second position where the first GAF intersects the first optical path segment and the second GAF intersects neither optical path segment, and a third position where the first GAF intersects neither optical path segment and the second GAF intersects the second optical path segment, and
      a second actuating arm comprising a third GAF and a fourth GAF, wherein the second actuating arm is movable between a first position where the third GAF intersects the first optical path segment and the fourth GAF intersects the second optical path segment, a second position where the third GAF intersects the first optical path segment and the fourth GAF intersects neither optical path segment, and a third position where the third GAF intersects neither optical path segment and the fourth GAF intersects the second optical path segment.

2. The optical system of claim 1, wherein the first and second actuating arms are movable between four positions and in one of the four positions no GAF intersects either optical path segment.

3. An optical system comprising:
   an optical amplifier, the optical amplifier having an optical path, wherein the optical path is folded resulting in a first optical path segment and a second optical path segment, and
   a gain flattening filter (GFF) with portions of the GFF adapted to be selectively inserted to intersect the first optical path segment and other portions of the GFF adapted to be selectively inserted to intersect the second optical path segment, wherein the optical path is folded at approximately 90 degrees with the first optical path segment extending in a first direction and the second optical path segment extending in a direction orthogonal to the first direction, and wherein the GFF comprises:
      an L-shaped member of a first arm and a second arm orthogonally connected,
      a first GAF on the first arm,
      a second GAF on the first arm,
      a third GAF on the second arm,
      a fourth GAF on the second arm,
      wherein the L-shaped member is adapted to be translated between a first position wherein the first GAF intersects the first optical path segment and a second position where the second GAF intersects the first optical path segment, and a third position wherein the third GAF intersects the second optical path segment, and a fourth position wherein the fourth GAF intersects the second optical path segment.

4. The optical system of claim 3, wherein the L-shaped member is adapted to be translated to a fifth position wherein neither the first GAF nor the second GAF intersect the first optical path segment, and is adapted to be translated to a sixth position wherein neither the third GAF nor the fourth GAF intersect the second optical path segment.

5. An optical system comprising:
   an optical amplifier, the optical amplifier having an optical path, and
   a gain flattening filter (GFF) with portions of the GFF adapted to be selectively inserted to intersect the optical path, the GFF comprising a planar body with the planar body normal to the optical path, the planar body having at least two coplanar levels and comprising:
      a first planar gain attenuating filter (GAF) on a first level,
      a second GAF on a second level, and, with a reference direction normal to the planar body, the second GAF partially offset in the reference direction from the first GAF and partially overlapping the first GAF in the reference direction,
   translating means for moving the GFF, with respect to the optical path, between at least three positions, a first position with the optical path intersecting the first GAF, a second position with the optical path intersecting both the first and second GAF, and a third position with the optical path intersecting the second GAF.

6. The optical system of claim 5, wherein the translating means comprise reflectors that move the optical path.

7. The optical system of claim 5, wherein the translating means comprise a servomotor for moving the GFF with respect to the optical path.

* * * * *